(12) United States Patent
Cislo et al.

(10) Patent No.: US 8,425,147 B2
(45) Date of Patent: Apr. 23, 2013

(54) DRAINAGE SYSTEM HAVING AN END CAP FOR DIVERTING FLUID

(75) Inventors: Joshua James Cislo, Bethlehem, GA (US); Courtney Jay Ashliman, North Logan, UT (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 621 days.

(21) Appl. No.: 12/611,831

(22) Filed: Nov. 3, 2009

(65) Prior Publication Data

US 2011/0100493 A1 May 5, 2011

(51) Int. Cl.
*F16L 55/115* (2006.01)
(52) U.S. Cl.
USPC .............................................. 405/42; 138/89
(58) Field of Classification Search .................... 405/36, 405/42; 138/89, 96
See application file for complete search history.

(56) References Cited

U.S. PATENT DOCUMENTS

| | | | |
|---|---|---|---|
| 3,363,799 A * | 1/1968 | Zurcher et al. .................. 405/42 |
| 3,670,894 A | 6/1972 | Friedl | |
| 4,419,231 A | 12/1983 | Friedl | |
| 4,739,799 A * | 4/1988 | Carney et al. .................... 138/89 |
| 5,014,866 A * | 5/1991 | Moore ............................ 215/364 |
| 5,033,510 A * | 7/1991 | Huber ............................. 138/90 |
| 5,378,356 A | 1/1995 | Logsdon | |
| 5,819,804 A * | 10/1998 | Ferrer et al. .................... 138/89 |
| 6,032,515 A * | 3/2000 | Huber ............................ 73/49.1 |
| 6,182,704 B1 * | 2/2001 | Bevacco ......................... 138/89 |
| 6,360,779 B1 * | 3/2002 | Wagner et al. ................. 138/92 |
| 6,595,243 B2 | 7/2003 | Tarr | |
| 6,746,178 B1 * | 6/2004 | Hensley et al. ................. 405/41 |
| 6,893,864 B2 * | 5/2005 | Allen ........................ 435/296.1 |
| 6,991,263 B2 | 1/2006 | Zarubaiko | |
| 7,108,783 B2 | 9/2006 | Glazik | |
| 2003/0145527 A1 | 8/2003 | Meyers | |

* cited by examiner

*Primary Examiner* — Tara M. Pinnock
(74) *Attorney, Agent, or Firm* — Finnegan Henderson Farabow Garrett & Dunner, L.L.P.

(57) ABSTRACT

A drainage system for draining a fluid is disclosed. The drainage system includes a drain basin having a tubular body, the tubular body including a lumen, an outer surface, a top end, and a bottom end. The drainage system also includes at least one pipe connected to the tubular body and an end cap coupled to the bottom end of the tubular body, the end cap including a convex surface configured to divert the fluid to the at least one pipe, wherein the convex surface of the end cap is inserted through the bottom end and is disposed within the lumen of the tubular body.

27 Claims, 11 Drawing Sheets

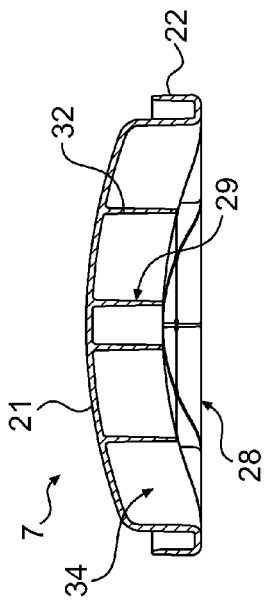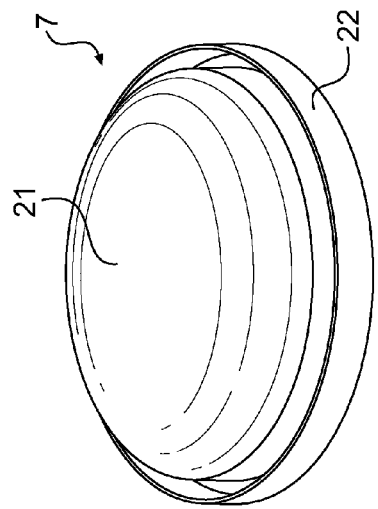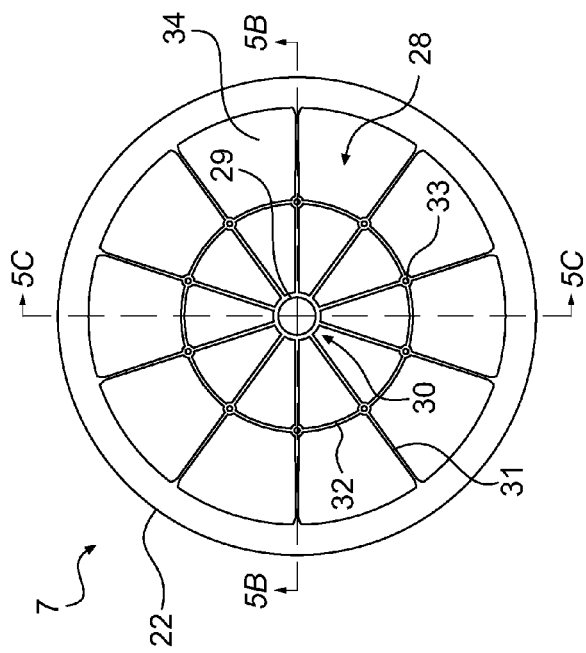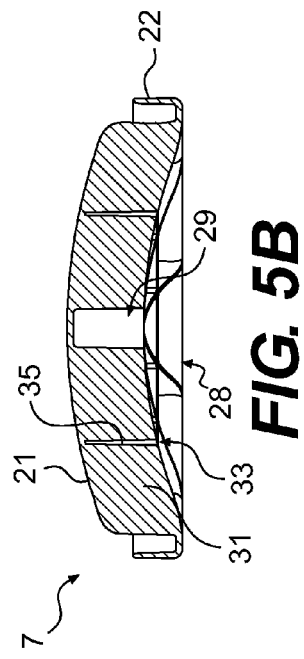

US 8,425,147 B2

DRAINAGE SYSTEM HAVING AN END CAP FOR DIVERTING FLUID

FIELD OF THE DISCLOSURE

The present disclosure is directed to a drainage system and coupling method, and more particularly, a drainage system including an end cap having a convex surface for diverting a fluid.

BACKGROUND OF THE DISCLOSURE

Drainage systems are typically used in various agricultural, residential, recreational, or civil engineering and construction applications for the drainage of fluids. In one example, such a drainage system may be employed to drain standing water which has accumulated during a storm or periods of flood. In another application, for example, a drainage system may facilitate the drainage of water from low spots or terraces in agricultural fields to improve the quality of the crops and/or the soil.

Such drainage systems generally include a drain basin (sometimes referred to as a "riser structure") and a network of pipes fluidly connected to the drain basin. The drain basin may typically embody a tubular structure including an open top end and a closed bottom end that is sealed off by an end cap (sometimes referred to as a "riser bottom"). In some embodiments, the drain basin may include a grated top coupled to the open top end of the tubular structure. The network of pipes may be positioned on a side surface of the drain basin intermediate the top and bottom ends. Fluid is caught and collected by the drain basin through its open top end and exits the drain basin through the network of pipes. The network of pipes then may divert and drain the fluid to an appropriate location away from the drainage system. Fluid may also enter the drain basin through one of the network of pipes and exit the drain basin through another of the network of pipes.

Although such an existing drainage system may drain and remove excess fluid from a site, it has several disadvantages and problems. For one, because a sump is formed between the end cap and the network of pipes, pooling of fluid occurs within the drain basin. This standing fluid at the bottom of the drain basin may cause, among other things, undesirable odors, bacterial growth, and promotion of pests, such as mosquitoes. Other limitations are related to, for example, the end cap. The end cap typically is welded or otherwise joined to the drain basin via an adhesive. This adhesive, however, ultimately wears down and degrades, heightening the likelihood of disengagement of the end cap and leakage of fluid from the drain basin. Also, existing end caps are not able to effectively support excessive loads and pressures transmitted from the fluid and from the ground where the drainage system is placed. These loads create excess stress on the end cap and ultimately lead to end cap damage and/or failure.

Accordingly, the drainage system of the present disclosure is directed to improvements in the existing technology.

SUMMARY OF THE DISCLOSURE

One exemplary aspect of the present disclosure is directed to an end cap for a tube. The end cap may include a convex surface on a first side of the end cap, the convex surface being configured to be inserted into the tube. The end cap may also include a concave portion on a second side of the end cap opposite the first side, the concave portion including a center. The end cap may also include a plurality of radial ribs extending from the center of the concave portion.

Another exemplary aspect of the present disclosure is directed to a drainage system for draining a fluid. The drainage system may include a drain basin having a tubular body, the tubular body including a lumen, an outer surface, a top end, and a bottom end. The drainage system may also include at least one pipe connected to the tubular body and an end cap coupled to the bottom end of the tubular body, the end cap including a convex surface configured to divert the fluid to the at least one pipe, wherein the convex surface of the end cap is inserted through the bottom end and is disposed within the lumen of the tubular body.

Yet another exemplary aspect of the present disclosure is directed to a method of coupling a drainage system for draining a fluid. The method may include providing a drain basin having a tubular body, the tubular body including a lumen, an outer surface, a top end, and a bottom end and connecting at least one pipe to the tubular body. The method may also include engaging an end cap to the bottom end of the tubular body, the end cap including a convex surface configured to divert the fluid to the at least one pipe, wherein the convex surface of the end cap is inserted through the bottom end and is disposed within the lumen of the tubular body.

In this respect, before explaining at least one embodiment of the present disclosure in detail, it is to be understood that the present disclosure is not limited in its application to the details of construction and to the arrangements of the components set forth in the following description or illustrated in the drawings. The present disclosure is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the present disclosure, and together with the description, serve to explain the principles of the present disclosure.

As such, those skilled in the art will appreciate that the conception upon which this disclosure is based may readily be used as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

FIG. 5A is a view of an end cap of a drainage system according to an exemplary disclosed embodiment;

FIG. 5B is a cross-sectional view of the end cap of FIG. 5A according to an exemplary disclosed embodiment;

FIG. 5C is another cross-sectional view of the end cap of FIG. 5A according to an exemplary disclosed embodiment;

FIG. 5D is a partial view of the end cap of FIG. 5A according to an exemplary disclosed embodiment;

DETAILED DESCRIPTION

Reference will now be made in detail to the exemplary embodiments of the present disclosure described above and illustrated in the accompanying drawings.

Figure 1:
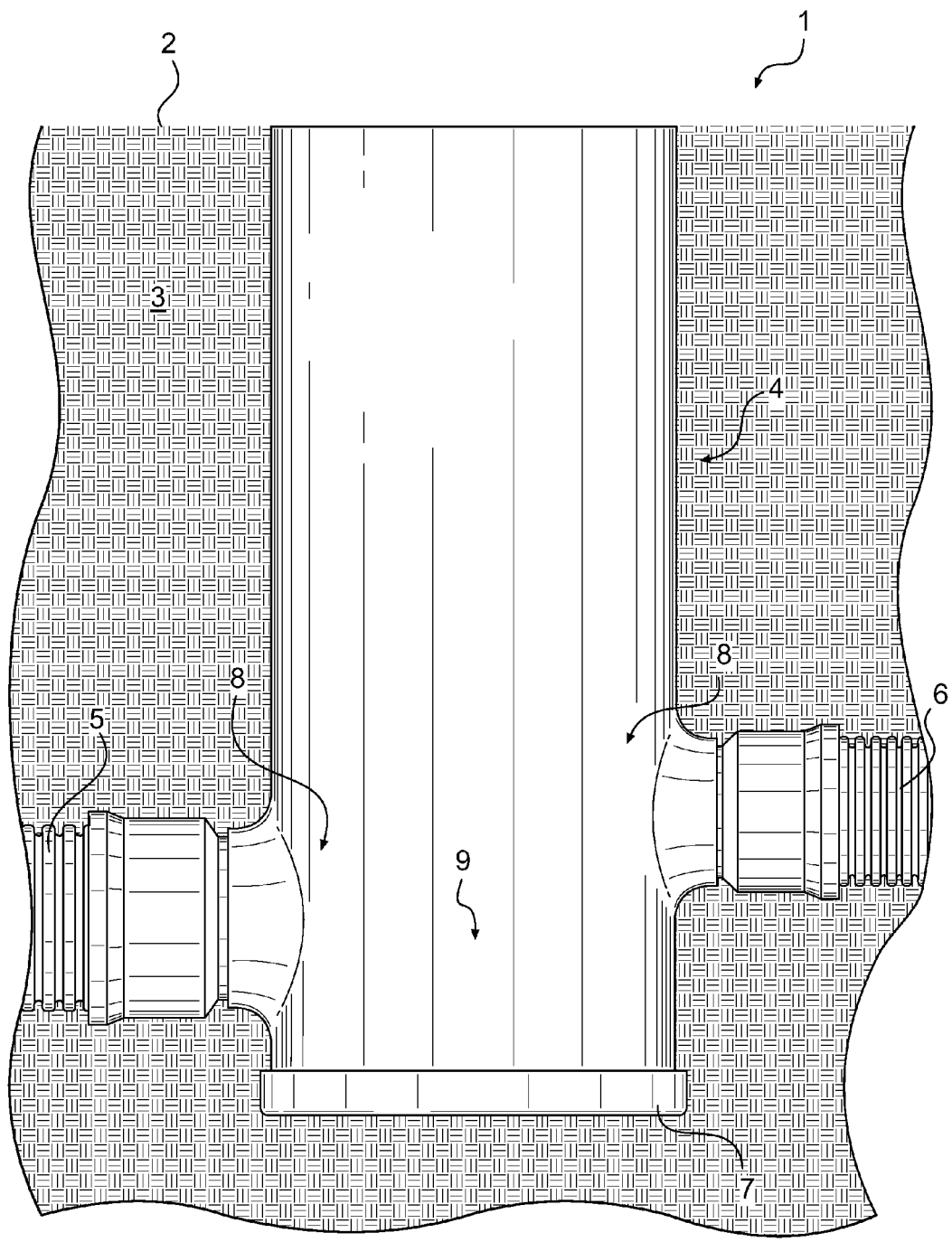
FIG. 1 is a partial view of a drainage system according to an exemplary disclosed embodiment.

FIG. 1 illustrates an exemplary drainage system 1 for collecting, transporting, and draining a fluid to an appropriate location. In one embodiment, drainage system 1 may be a subterranean drainage system disposed below a surface 2 of a ground 3, such as a road, sidewalk, or lot, and may be employed to drain excess rain or groundwater from ground 3 to an appropriate discharge point, such as a canal, river, lake, ocean, or treatment facility (not shown). It should be appreciated, however, that the details of the disclosed drainage system will be applicable in various other drainage settings. For example, drainage system 1 may be utilized in mining, agriculture, sewage disposal, a storm sewer, a turf or recreational field, the timber industry, landfill and waste disposal, road and highway drainage, and residential and commercial drainage applications for transporting and draining various types of fluid. It also should be appreciated that fluid may enter drain basin 4 through one of first and second pipes 5, 6 and exit drain basin 4 through the other of first and second pipes 5, 6.

In general, drainage system 1 may include a drain basin 4, a first pipe 5, a second pipe 6, and an end cap 7. First and second pipes 5, 6 may be coupled to a side surface 8 of drain basin 4, and end cap 7 may be connected to drain basin 4 at a bottom portion 9 of drain basin 4. It should be appreciated that in other embodiments, only a single pipe or more than two pipes may be coupled to drain basin 4. Fluid, such as, for example, rainwater, may enter drain basin 4 from surface 2 and may begin to collect at bottom portion 9 of drain basin 4. As the volume and fluid level within drain basin 4 rises, fluid may be distributed to and discharged from first and second pipes 5, 6. The discharged fluid then may be transported and drained to the appropriate discharge point via first and second pipes 5, 6.

Figure 2:
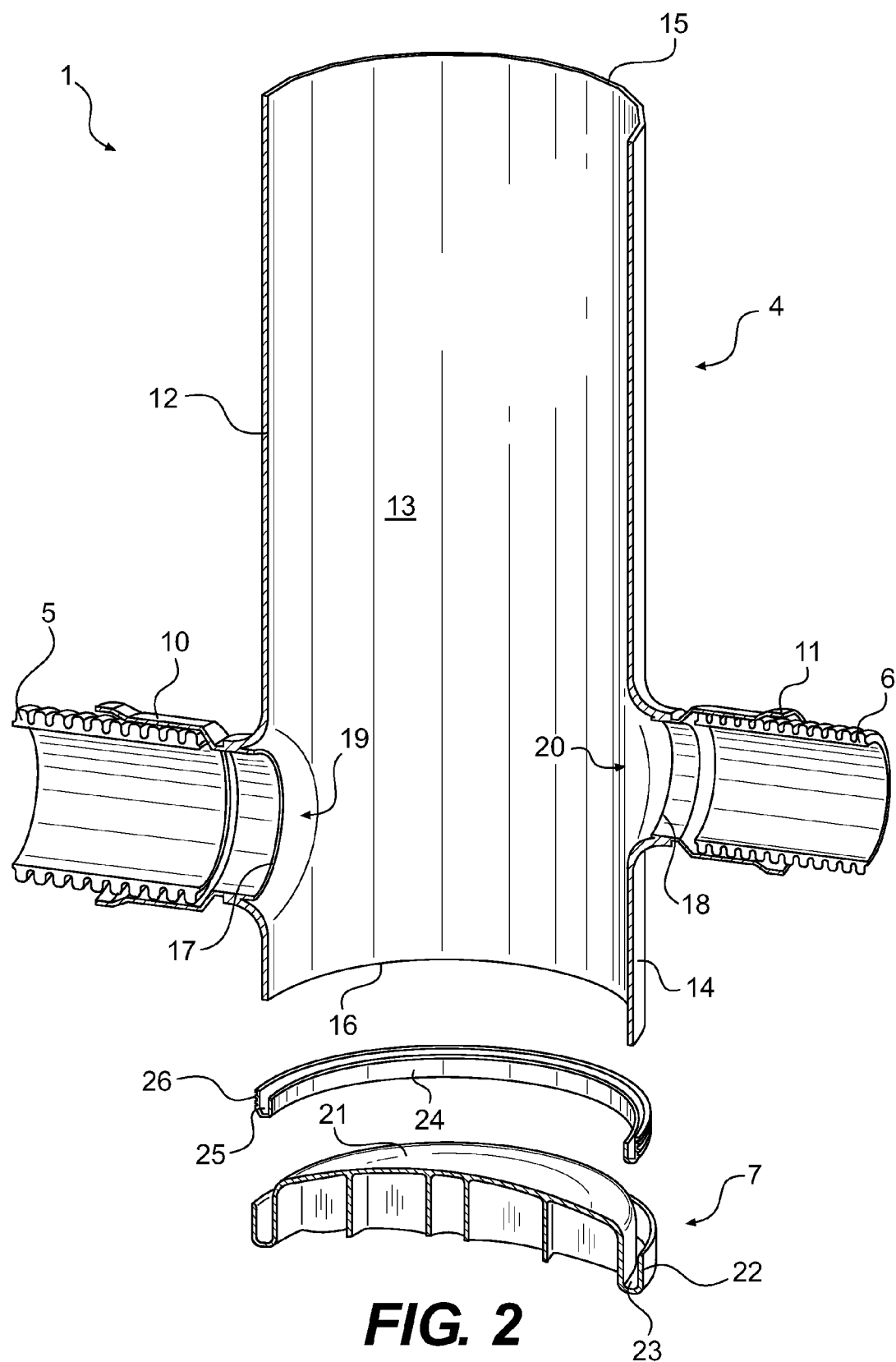
FIG. 2 is a partial, cross-sectional view of a drainage system according to an exemplary disclosed embodiment.

FIG. 2 illustrates an exemplary, partial cross-sectional view of drainage system 1. Drain basin 4 may include a first outlet sleeve 10, a second outlet sleeve 11, and a tubular body 12 having a lumen 13, an outer surface 14, a top end 15, and a bottom end 16. It should be appreciated that tubular body 12 may be any appropriate size or shape for collecting fluid, such as, for example, a cylindrical conduit.

First outlet sleeve 10 may be configured to connect first pipe 5 to tubular body 12, and second outlet sleeve 11 may be configured to connect second pipe 6 to tubular body 12. In one embodiment, first and second outlet sleeves 10, 11 may be integrally formed with tubular body 12. It should also be appreciated that first and second outlet sleeves 10, 11 may be separate structures and/or a different material from tubular body 12 and may be welded, fastened, or attached to tubular body 12 by any appropriate means known in the art. For example, first and second outlet sleeves 10, 11 may be formed of a more resilient and flexible material than tubular body 12 to accommodate an eased adjustment and positioning of sleeves 10, 11 relative to tubular body 12.

As illustrated in FIG. 2, first outlet sleeve 10 may have a different diameter than second outlet sleeve 11. Therefore, the diameters of first and second pipes 5, 6 also may be different to appropriately connect with first and second outlet sleeves 10, 11, respectively. Drainage system 1 may have different sized first and second sleeves 10, 11 and corresponding first and second pipes 5, 6 to manage the flow rate and volume of fluid drained from drain basin 4. For example, an outlet sleeve and corresponding pipe having a larger diameter may have a lower flow rate but a greater volume of discharged fluid than an outlet sleeve and pipe having a smaller diameter. In other embodiments, first and second outlet sleeves 10, 11, and their corresponding first and second pipes 5, 6, may have substantially the same diameter.

First outlet sleeve 10 and first pipe 5 may be defined and positioned below second outlet sleeve 11 and second pipe 6 to direct and drain fluid at different elevation levels, as illustrated in the exemplary embodiment of FIG. 2. In alternative embodiments of the present disclosure, first outlet sleeve 10 and first pipe 5 may be substantially level with second outlet sleeve 11 and second pipe 6. It should also be appreciated that either of first outlet sleeve 10 and first pipe 5 and second outlet sleeve 11 and second pipe 6 may be angled downward toward bottom end 16 of tubular body 12 of angled upward toward top end 15 of tubular body 12 to control the direction of drained fluid.

In the exemplary embodiment of FIG. 2, first and second pipes 5, 6 may be engaged to first and second outlet sleeves 10, 11, respectively, via a friction fit. In certain embodiments, first and second pipes 5, 6 may be engaged to first and second outlet sleeves 10, 11 via an adhesive, welding, or other appropriate connection means known in the art. The engagements of first and second pipes 5, 6 to first and second outlet sleeves 10, 11 may be fluid-tight connections. Moreover, one or more gaskets or any other suitable seal may be disposed between first pipe 5 and first outlet sleeve 10 and between second pipe 6 and second outlet sleeve 11 to provide the fluid-tight connections.

First and second pipes 5, 6 may be corrugated, polyethylene pipes. In other embodiments, first and second pipes 5, 6 may have smooth surfaces and may be formed from any other appropriate material, such as polyvinylchloride (PVC). First pipe 5 may also include a first inlet 17, and second pipe 6 may also include a second inlet 18. First and second inlets 17, 18 may be fluidly connected to lumen 13 of tubular body 12 at first and second junctions 19, 20, respectively. First and second junctions 19, 20 may be the fluidic intersection points between first and second pipes 5, 6 and lumen 13 where fluid enters first and second pipes 5, 6 from lumen 13.

As illustrated in FIG. 2, end cap 7 may be associated with bottom end 16 of tubular body 12. End cap 7 may include a convex surface 21 and a raised lip 22. A U-shaped channel 23 may be formed between raised lip 22 and convex surface 21 and may circumscribe convex surface 21. End cap 7 may be a single piece of material such that raised lip 22 may be continuously formed with convex surface 21. In one embodiment, end cap 7 may be injection molded from high density polyethylene (HDPE). Injection molding may provide eased production and may decrease the time of production of end cap 7. Utilizing materials, such as HDPE, may also provide impact resistance from ground 3, caused by, for example, debris, such as rocks, sticks, and dirt. Moreover, materials, like HDPE, provide impact resistance and durability associated with transportation and handling of drainage system 1, for example, when drainage system 1 is dropped on or dragged through ground 3.

Drainage system 1 may also include a sealing member 24 associated with bottom end 16 of tubular body 12. Sealing member 24 may be any suitable type of annular, water-tight gasket. For example, sealing member 24 may be a dual-elastomer gasket including any suitable type of material, such as rubber, polyethylene, Teflon, EPDM, nitrile, thermoplastic elastomers, isoprene, or other plastic compounds. Sealing member 24 may also incorporate various metal inserts or rings, as necessary, to provide structural rigidity. Sealing member 24 may have an annular shape and may also include a U-shaped channel 25. Sealing member 24 may also include ridges 26 circumscribing an outer circumferential surface of sealing member 24.

Figure 3:
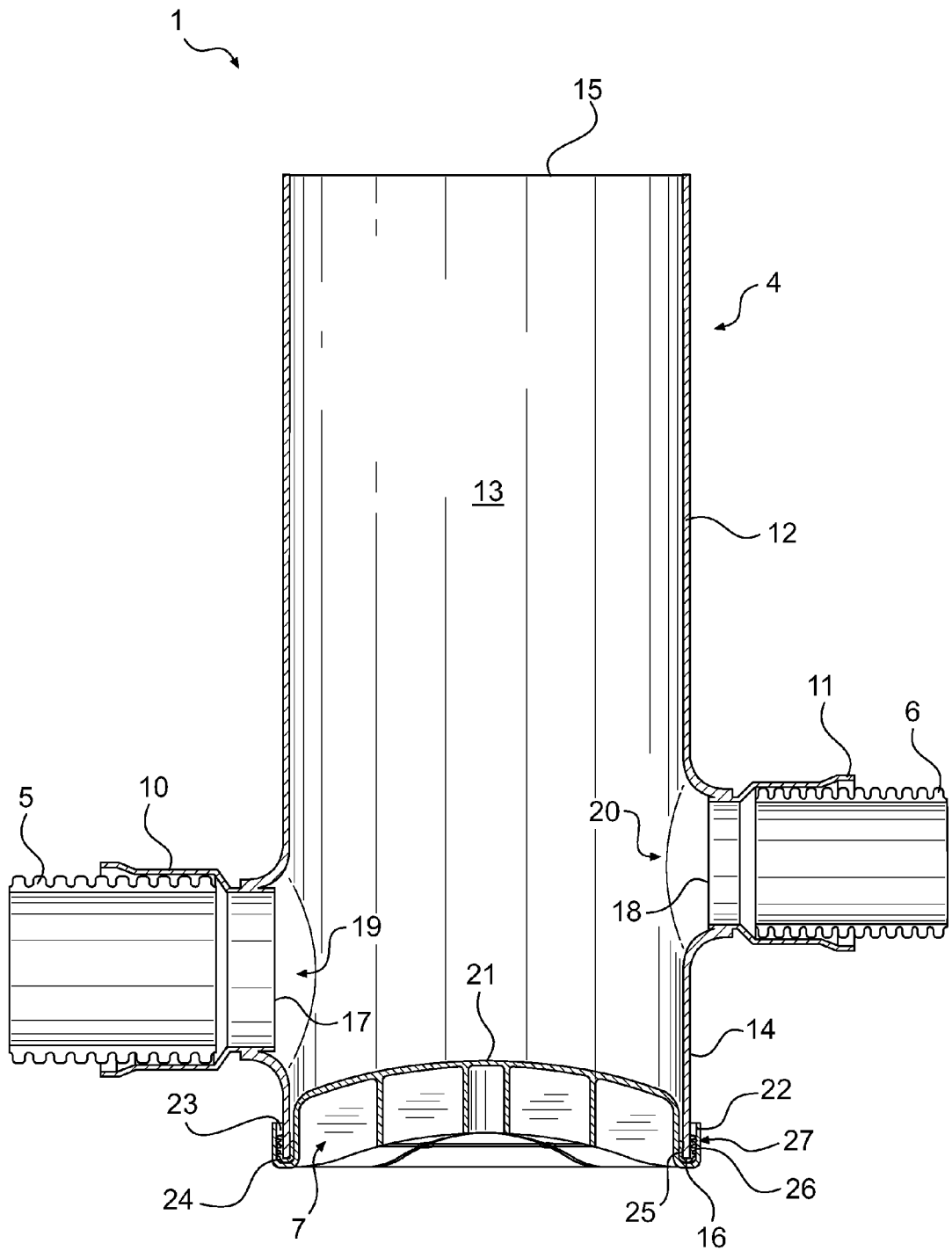
FIG. 3 is another partial, cross-sectional view of a drainage system according to an exemplary disclosed embodiment.

FIG. 3 is another exemplary partial, cross-sectional view of drainage system 1 and illustrates a coupling of drainage system 1. As shown in FIG. 3, end cap 7 may be engaged with bottom end 16 of tubular body 12. In particular, convex surface 21 may be inserted through bottom end 16 and may be disposed within lumen 13 of tubular body 12.

In the embodiment of FIG. 3, bottom end 16 of tubular body 12 may be inserted into U-shaped channel 25 of sealing member 24. Once convex surface 21 is fully inserted into lumen 13, sealing member 24 may be disposed within U-shaped channel 23 of end cap 7. Sealing member 24 may form a seal between raised lip 22 and outer surface 14 of tubular body 12 via a friction fit. Ridges 26 may provide additional friction against and grip onto raised lip 22 within U-shaped channel 23. Such a configuration may provide a fluid-tight interface 27 between end cap 7 and drain basin 4.

Upon engagement of end cap 7 to drain basin 4, raised lip 22 may be coupled to tubular body 12 and configured to engage outer surface 14 of tubular body 12 via sealing member 24. In other embodiments, raised lip 22 may be shaped to directly engage outer surface 14 without sealing member 24. Any suitable method of directly attaching raised lip 22 to outer surface 14 and fluidly sealing end cap 7 to drain basin 4 may be employed. For example, raised lip 22 may be welded or otherwise adhered to outer surface 14 via any known water-tight adhesive.

In certain embodiments, raised lip 22 may protrude upwardly to a height shorter than a height of the convex surface 21, as shown in FIG. 3. Such an arrangement may provide eased assembly and disassembly of end cap 7 on and off drain basin 4. For example, convex surface 21 may be readily inserted into lumen 13 prior to aligning and engaging raised lip 22 with outer surface 14 of tubular body 12. In alternative embodiments of the present disclosure, raised lip 22 may have substantially the same height as convex surface 21 or may protrude to a height taller than convex surface 21. These alternative arrangements may provide additional support and stability for end cap 7 as raised lip 22 may engage a greater surface area of outer surface 14.

Upon insertion of end cap 7 into lumen 13, convex surface 21 may be positioned up to junction 19. In another exemplary embodiment, as shown in FIG. 3, convex surface 21 may be positioned below junction 19. Alternatively, convex surface 21 may be positioned at a height level within junction 19 (i.e., convex surface 21 may be positioned at a height substantially level with the center of the lumen of first pipe 5). In either case, convex surface 21 may be positioned relative to the lowest defined outlet of drainage system 1, which in the exemplary embodiments of the present disclosure, may be junction 19 between first pipe 5 and lumen 13.

Fluid may enter drain basin 4 under drainage conditions. As the fluid begins to fill the bottom of drain basin 4, convex surface 21 may divert the fluid to first pipe 5 and second pipe 6. The protruding shape of convex surface 21 and its position relative to junction 19 may facilitate the flow of the fluid to first and second pipes 5, 6. For example, convex surface 21 may raise the fluid within drain basin 4 to junctions 19 and 20, and the fluid then may exit drain basin 4 via first and second pipes 5, 6.

Figure 4:
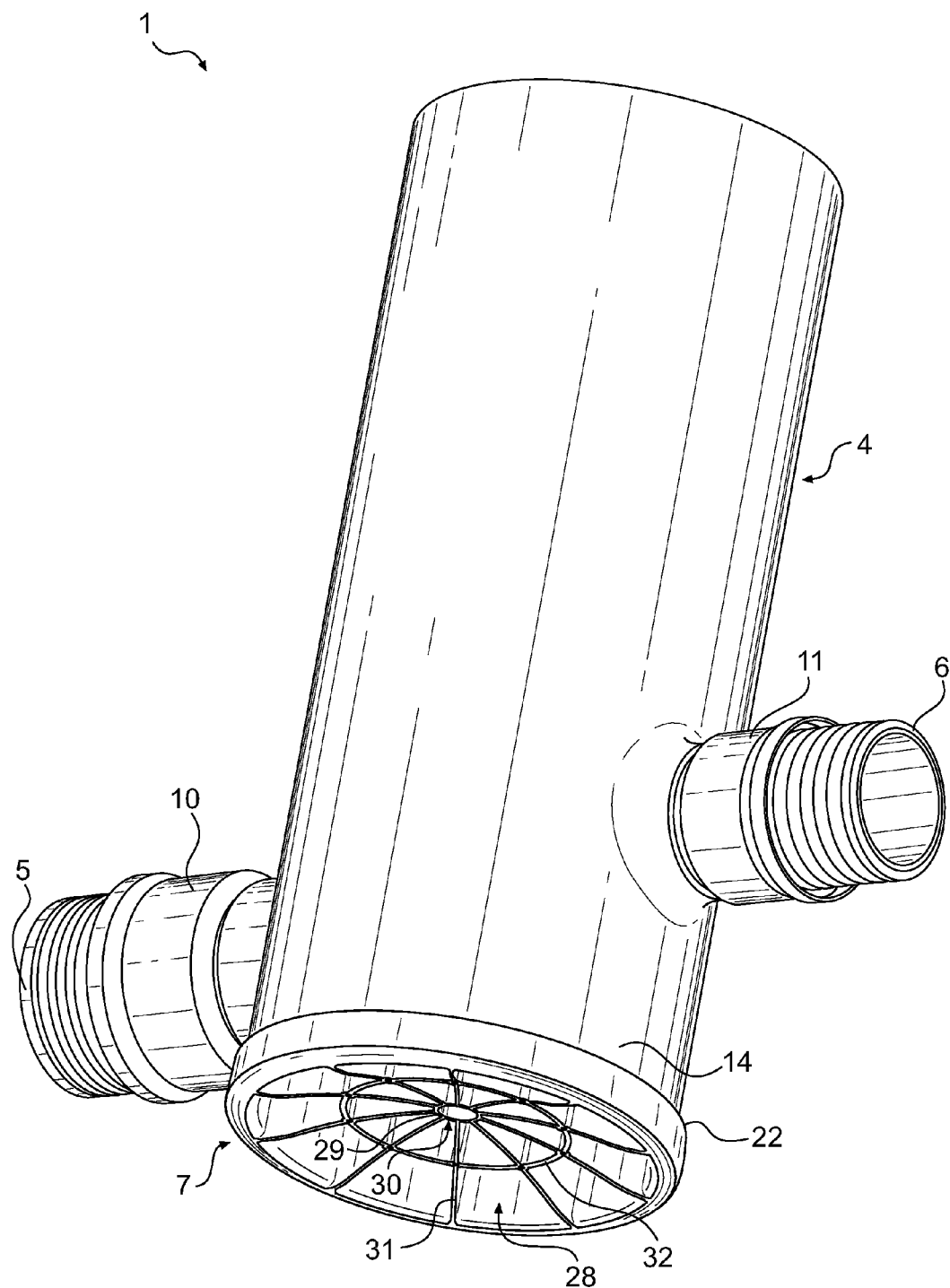
FIG. 4 is another partial view of a drainage system according to an exemplary disclosed embodiment.

FIG. 4 illustrates an exemplary bottom perspective of drainage system 1. As discussed above, raised lip 22 may be coupled to outer surface 14 of tubular body 12. In particular, and as shown in FIG. 4, raised lip 22 may enwrap outer surface 14 to engage end cap 7 to drain basin 4. End cap 7 may also include a concave portion 28, which may be formed on the underside of end cap 7, opposite convex surface 21. Concave portion 28 may include a cylindrical member 29 positioned at a center 30 of the concave portion 28 and a plurality of radial ribs 31 extending from center 30 to raised lip 22. In certain embodiments, radial ribs 31 may extend from cylindrical member 29 to raised lip, as shown in FIG. 4. In alternate embodiments of the present disclosure, it is contemplated that radial ribs 31 may directly intersect each other at center 30. Concave portion 28 may also include an annular rib 32 intersecting radial ribs 31. Although FIG. 4 illustrates one annular rib 32, it should be appreciated that concave portion 28 may include more than one annular rib 32.

FIG. 5A illustrates an exemplary view of concave portion 28 of end cap 7. Radial ribs 31, annular rib 32, cylindrical member 29, and raised lip 22 may be integrally formed from a single piece of material. It is also contemplated that any of radial ribs 31, annular rib 32, cylindrical member 29, or raised lip 22 may be separate materials and may be attached to each other by any suitable method. Annular rib 32 may circumscribe center 30 of concave portion 28 and may intersect each of radial ribs 31 at intersection points 33.

Radial ribs 31 provide structural support for end cap 7. For example, radial ribs 31 may support convex surface 21 upon pressure and load applied to end cap 7 by fluid within drain basin 4. This structural support may, for example, prevent convex surface 21 from collapsing due to fluid accumulation. Annular rib 32 provides additional support for radial ribs 31 and convex surface 21. In one instance, for example, annular rib 32 may provide structural reinforcement to radial ribs 31 by bracing radial ribs 31 and hindering excess shifting or movement of radial ribs 31 in response to load or pressure applied to convex surface 21. Radial ribs 31 and annular rib 32 may also provide structural support for end cap 7 from load and pressure applied onto concave portion 28 by ground 3, as shown in FIG. 1, for example.

Concave portion 28 may also include discrete hollow spaces 34. Each hollow space 34 may be defined by a portion of cylindrical member 29 or raised lip 22 and portions of radial ribs 31 and annular rib 32. For example, hollow space 34 may be a chamber formed by the portion of annular rib 32 between adjacent intersection points 33 and the portions of radial ribs 31 extending from the adjacent intersection points 33 to raised lip 22. Hollow space 34 may also be a chamber formed by the portion of annular rib 32 between adjacent intersection points 33 and the portions of radial ribs 31 extending from the adjacent intersection points 33 to cylindrical member 29.

FIG. 5B illustrates an exemplary cross-sectional view of end cap 7 along dashed line "5B" of FIG. 5A. As shown in FIG. 5B, concave portion 28 may be formed on the opposite side of convex portion 21. In the exemplary embodiment of FIG. 5B, cylindrical member 29 may be integrally formed with radial ribs 31 and may be hollow. This may reduce stresses applied onto end cap 7 by providing resilient support for convex surface 21. For example, the hollowed cylindrical member 29 may provide flexibility to certain sections of convex surface 21 (i.e., the central section) as load is applied to end cap 7 by fluid. In alternative embodiments of the present disclosure, it is contemplated that cylindrical member 29 may be a solid material to provide additional structural strength to convex surface 21. For example, cylindrical member 29 may be a solid cylinder integrally formed with radial ribs 31 or may be filled with any suitable reinforcing material. This arrangement may, for example, provide rigidity for convex surface 21 and reinforce convex surface 21 under load and pressure.

Each intersection point 33 between radial ribs 31 and annular rib 32 may include at least one slit 35 extending up toward convex surface 21. Slit 35 may be, for example, a boss hole configured to provide improved distribution load at each intersection point 33 and enhanced molding between radial rib 31 and annular rib 32 at intersection point 33. In an exemplary embodiment, slits 35 may extend all the way up to convex surface 21. Slits 35 may generally become more narrow towards convex surface 21, as shown in the exemplary embodiment of FIG. 5B. It should also be appreciated that slit 35 may be substantially the same thickness along the entire length of slit 35. Slits 35 may also reduce stresses applied onto end cap 7 by providing resilient support for convex surface 21 at, for example, intersection points 33. For example, slits 35 may provide flexibility to convex surface 21 as load is applied to end cap 7 by fluid. It is contemplated that the degree of flexibility imparted by slits 35 may vary based on the length and thickness of each slit 35. For example, the flexibility of convex surface 21 may increase as the lengths of slits 35 extend closer to convex surface 21 and when slits 35 are thicker in width.

FIG. 5C illustrates an exemplary cross-sectional view of end cap 7 along dashed line "5C" of FIG. 5A. As shown in FIG. 5C, annular rib 32 and cylindrical member 29 may also be integrally formed with convex surface 21. FIG. 5C also illustrates another view of hollow spaces 34 of concave portion 28. Because concave portion 28 includes hollow spaces 34, the total amount of material utilized to form end cap 7 may be minimized. End cap 7 may therefore by a lightweight structure. Hollow spaces 34 may also provide another degree of structural flexibility to convex surface 21, thereby, reducing overall stresses applied to end cap 7.

FIG. 5D illustrates an exemplary partial top view of end cap 7. In the embodiment of FIG. 5D, convex surface 21 may be arched and have a domed-shape. The domed-shape of convex surface 21 may facilitate the distribution of fluid from the central section of end cap 7 to the outer boundary of end cap 7. This distribution of fluid may improve the discharge of fluid from drainage system 1. For example, and also with reference to FIG. 3, fluid may be urged to the outer boundary of end cap 7 and thus to first and second pipes 5, 6 of drainage system 1. The domed-shape may also distribute at least some of the load imparted by fluid to the outer boundary of end cap 7, thereby, reducing overall stress to end cap 7. It also should be appreciated that convex surface 21 may embody other shapes. For example, convex surface 21 may include one or more side surfaces meeting to form a substantially pointed tip or meeting at a substantially flat top.

Figure 6:
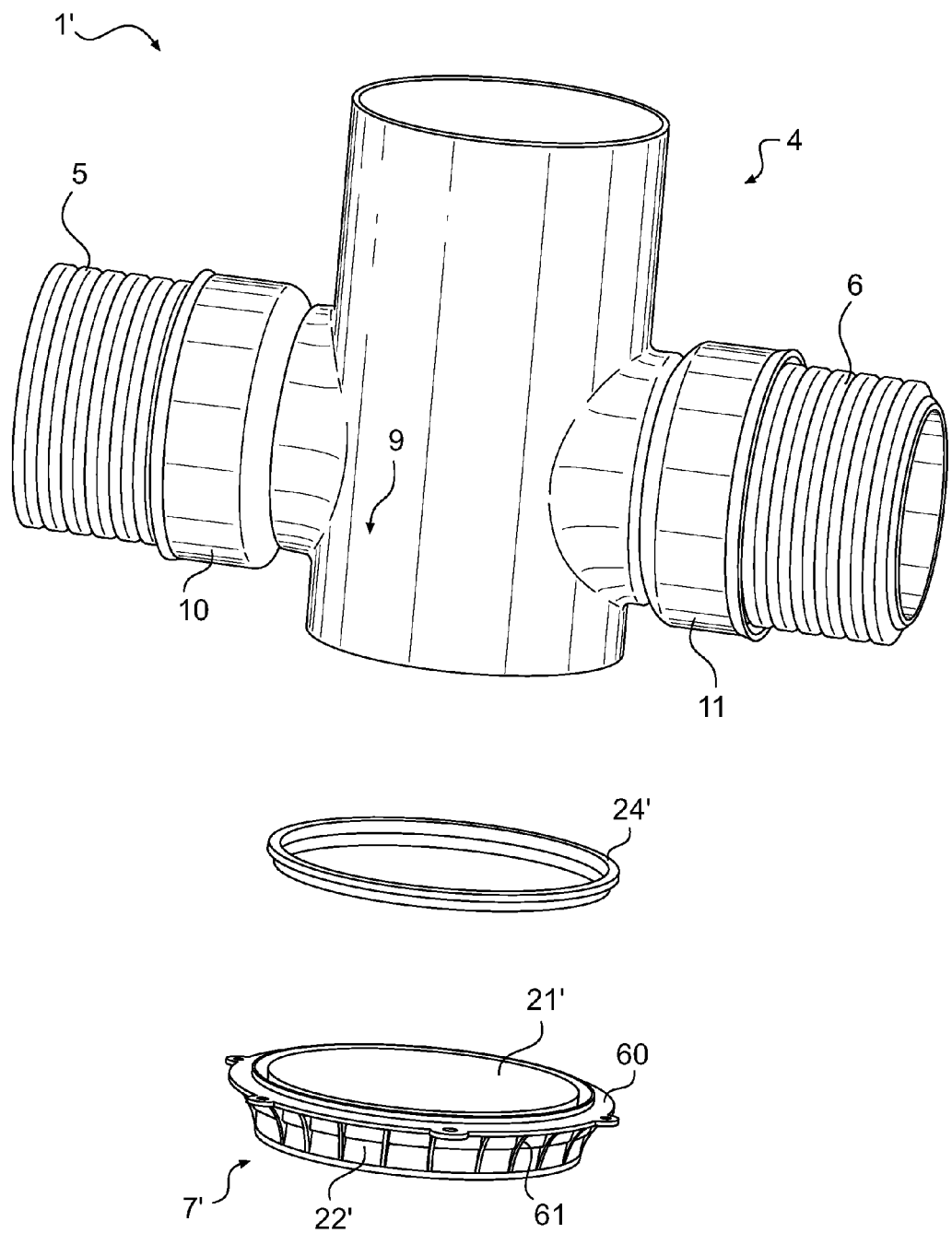
FIG. 6 is a partial view of a drainage system according to an alternative exemplary disclosed embodiment.

FIG. 6 illustrates an exemplary partial view of an alternative embodiment of drainage system 1'. In a similar manner as described above in the embodiments of FIGS. 1-3, drainage system 1' may include drain basin 4, first pipe 5, and second pipe 6. Also, as described above, drain basin 4 may include first and second outlet sleeves 10, 11 to which first pipe 5 and second pipe 6 may respectively be connected. In the embodiment of FIG. 6, first outlet sleeve 10 and first pipe 5 may be substantially level with second outlet sleeve 11 and second pipe 6. Drainage system 1' may also include a sealing member 24' and an end cap 7' coupled to drain basin 4 at bottom portion 9 of drain basin 4.

As will be discussed in greater detail below, end cap 7' may include a convex surface 21', a raised lip 22', an outer flange 60, and a plurality of braces 61. Additionally, end cap 7' may be made of a single piece of material such that convex surface 21', raised lip 22', outer flange 60, and plurality of braces 61 may be continuously formed. In one embodiment, end cap 7' also may be injection molded from high density polyethylene (HDPE).

Figure 7:
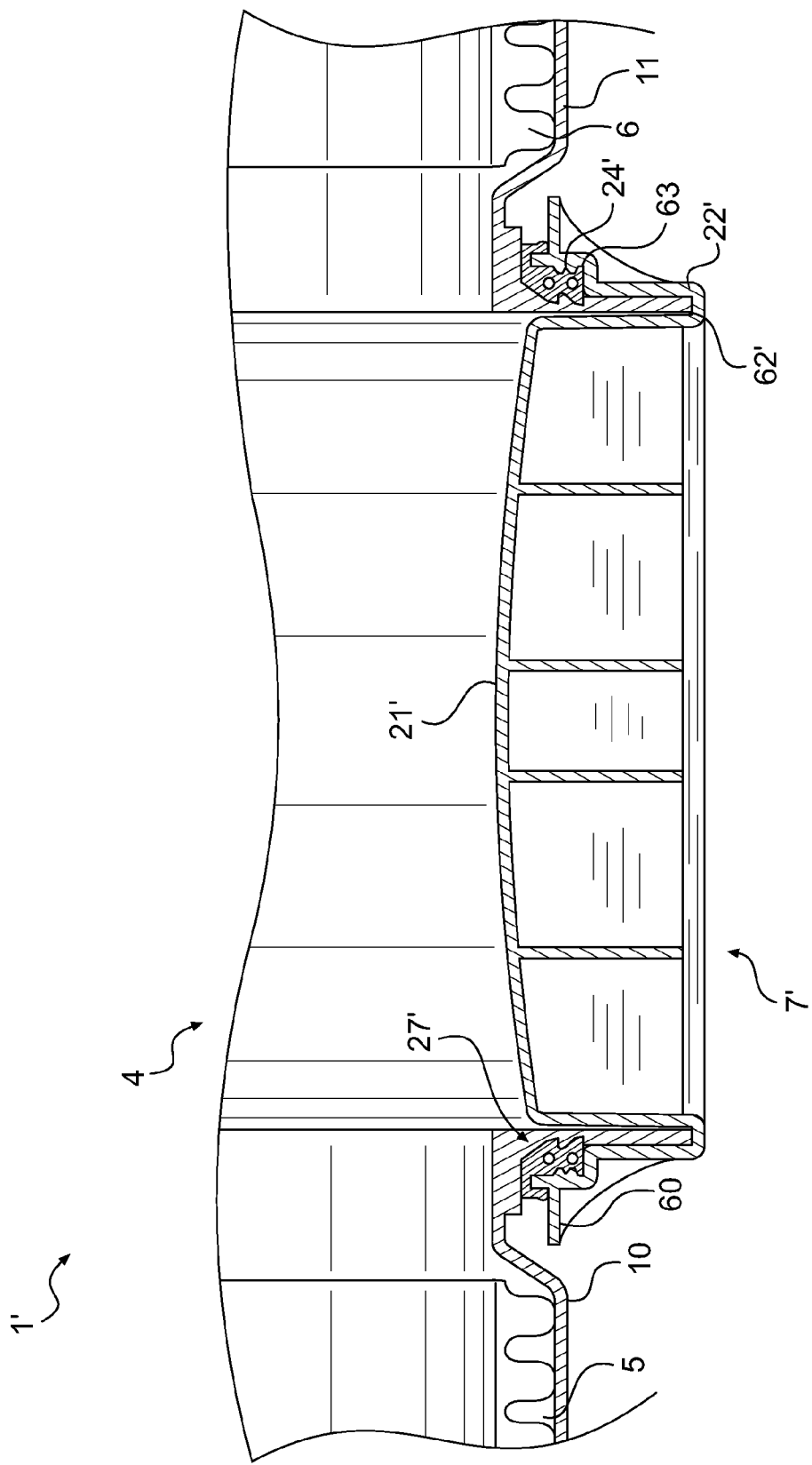
FIG. 7 is a partial, cross sectional view of the FIG. 6 drainage system according to an alternative exemplary disclosed embodiment.

FIG. 7 illustrates a partial, cross sectional view of drainage system 1'. End cap 7' may be connected to drain basin 4 by inserting convex surface 21' into drain basin 4. Convex surface 21' may extend up to first pipe 5 and second pipe 6. In another embodiment, for example, convex surface 21' may extend to a position immediately below first and second pipes 5, 6. In a similar manner as described in the embodiment of FIG. 3, fluid may enter drain basin 4, and as the fluid begins to fill the bottom of drain basin 4, convex surface 21' may divert the fluid to first pipe 5 and second pipe 6. The protruding shape of convex surface 21' and its position relative to first pipe 5 may facilitate the flow of the fluid to first and second pipes 5, 6. For example, convex surface 21' may raise the fluid within drain basin 4 to first and second pipes 5, 6, and the fluid then may exit drain basin 4 via first and second pipes 5, 6.

As illustrated in FIG. 7, end cap 7' may include a first channel 62 and a second channel 63 defined by raised lip 22'. First channel 62 may be formed between raised lip 22' and convex surface 21', and second channel 63 may be formed from raised lip 22' and protrude laterally from first channel 62. In one embodiment, drain basin 4 may be inserted into first channel 62 of end cap 7', and sealing member 24' may be received within second channel 63. Sealing member 24' may be positioned around an outer surface of drain basin 4 and may abut first and second sleeves 10, 11. This engagement may provide a fluid tight interface 27' between end cap 7' and drain basin 4. Sealing member 24' may be any suitable type of annular, water-tight gasket. For example, sealing member 24' may be a dual-elastomer gasket including any suitable type of material, such as rubber, polyethylene, Teflon, EPDM, nitrile, thermoplastic elastomers, isoprene, or other plastic compounds. Sealing member 24' may also incorporate various metal inserts or rings, as necessary, to provide structural rigidity.

Outer flange 60 may be integrally formed with and circumscribe raised lip 22'. The protruding configuration of outer flange 60 may provide support and stability for end cap 7'. For example, outer flange 60 may provide additional surface area for the ground, surface, or backfill, to which drainage system 1' is disposed, to push up against. The end cap 7' may therefore be further reinforced to drain basin 4 via outer flange 60.

Figure 8:
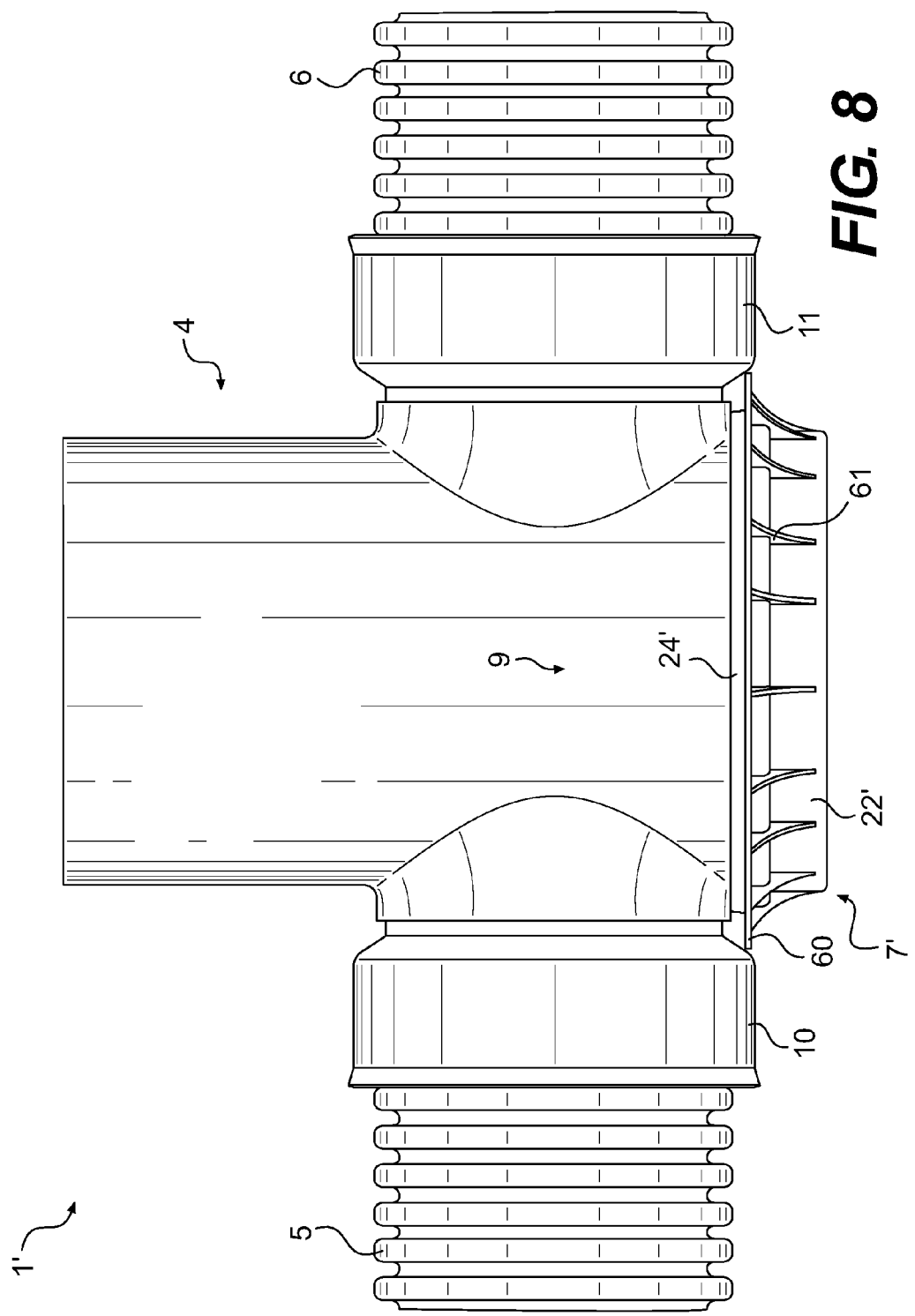
FIG. 8 is another partial view of the FIG. 6 drainage system according to an alternative exemplary disclosed embodiment.

FIG. 8 is another partial view of drainage system 1' and illustrates a coupling of drainage system 1'. As discussed above, once end cap 7' and sealing member 24' are engaged with drain basin 4, sealing member 24' may wrap around the outer surface of drain basin 4 and may abut first and second outlet sleeves 10, 11. This configuration may help secure sealing member 24' to drain basin 4 and end cap 7'. Sealing member 24' also may partially extend from end cap 7' to a point at which there is no contact between sealing member 24' and first and second outlet sleeves 10, 11.

As illustrated in FIG. 8, plurality of braces 61 may be circumferentially arranged around raised lip 22' and engage outer flange 60. Plurality of braces 61 may be integrally formed with outer flange 60 and raised lip 22'. In one alternative embodiment, plurality of braces 61 may be separate structures and may be made of the same material as outer flange 60 and raised lip 22' Alternatively, plurality of braces 61 may be separate structures and may be made of a different material from outer flange 60 and raised lip 22'. Plurality of braces 61 may provide support for outer flange 60. For example, as the top of outer flange 60 experiences load and pressure from material, such as dirt, backfill, soil, or gravel, plurality of braces 61 may reinforce outer flange 60 by absorbing stress.

Figure 9:
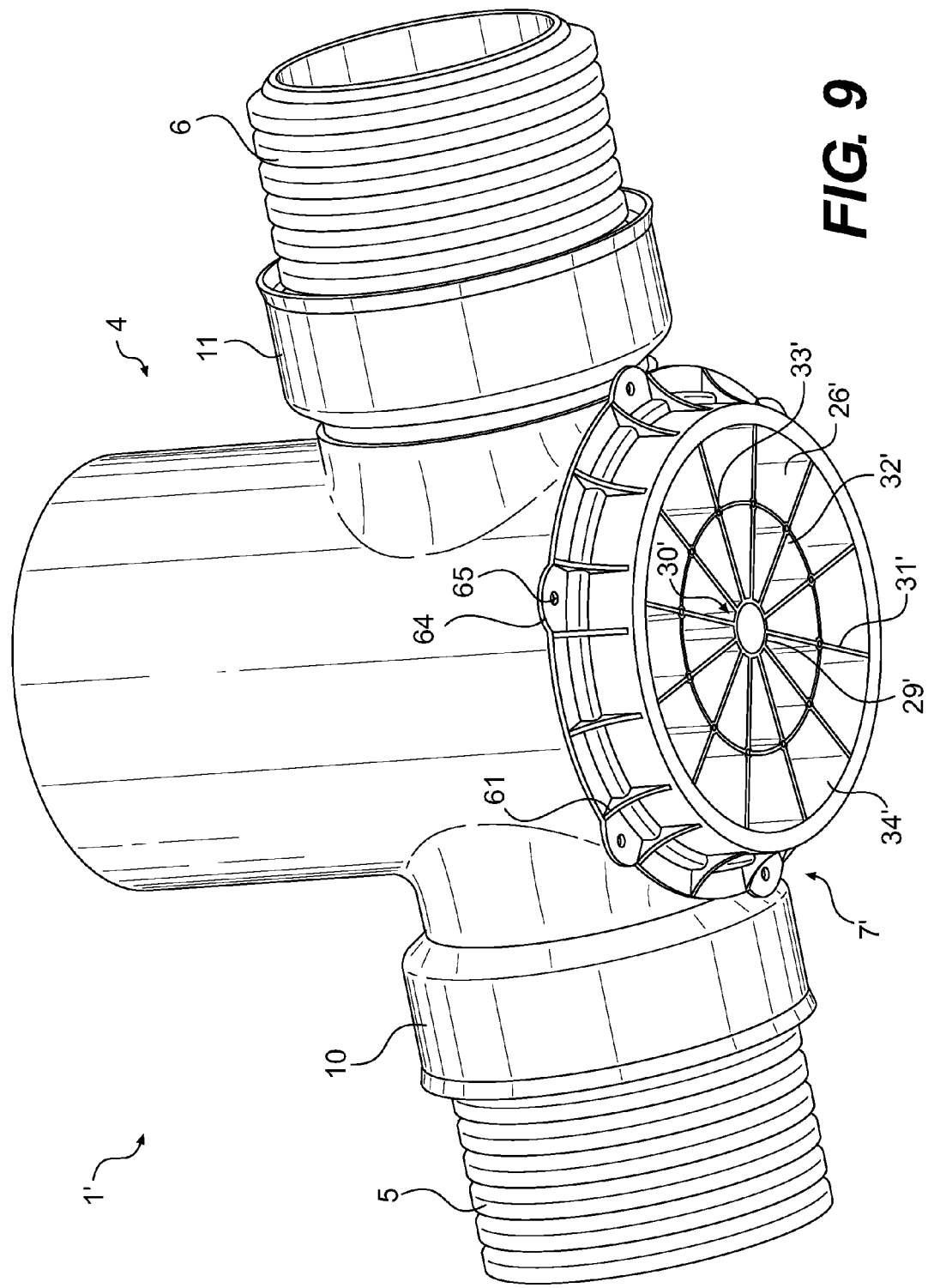
FIG. 9 is another partial view of the FIG. 6 drainage system according to an alternative exemplary disclosed embodiment.

FIG. 9 illustrates an exemplary bottom perspective of drainage system 1'. End cap 7' may also include a concave portion 28', which may be formed on the underside of end cap 7', opposite convex surface 21'. In a similar manner as described in the embodiment of FIG. 4, concave portion 28' may include a cylindrical member 29' positioned at a center 30' of concave portion 28' and a plurality of radial ribs 31' extending from center 30' to raised lip 22'. Concave portion 28' may also include an annular rib 32' intersecting radial ribs 31' at intersection points 33'. Hollow spaces 34' may also be defined on concave portion 28'.

As illustrated in FIG. 9, outer flange 60 may include a plurality of radial projections 64. In one embodiment, radial projections 64 may be defined between adjacent braces 61. Alternatively, radial projections 64 may intersect braces 61. Each radial projection 64 may include an aperture 65. Aperture 65 may be configured to receive a securing element (not shown), such as a stake, to drive into the surface or ground to which drainage system 1' is disposed. Such a configuration may prevent or minimize movement of end cap 7' and drain basin 4, and therefore, may secure drainage system 1' while in use.

Figure 10:
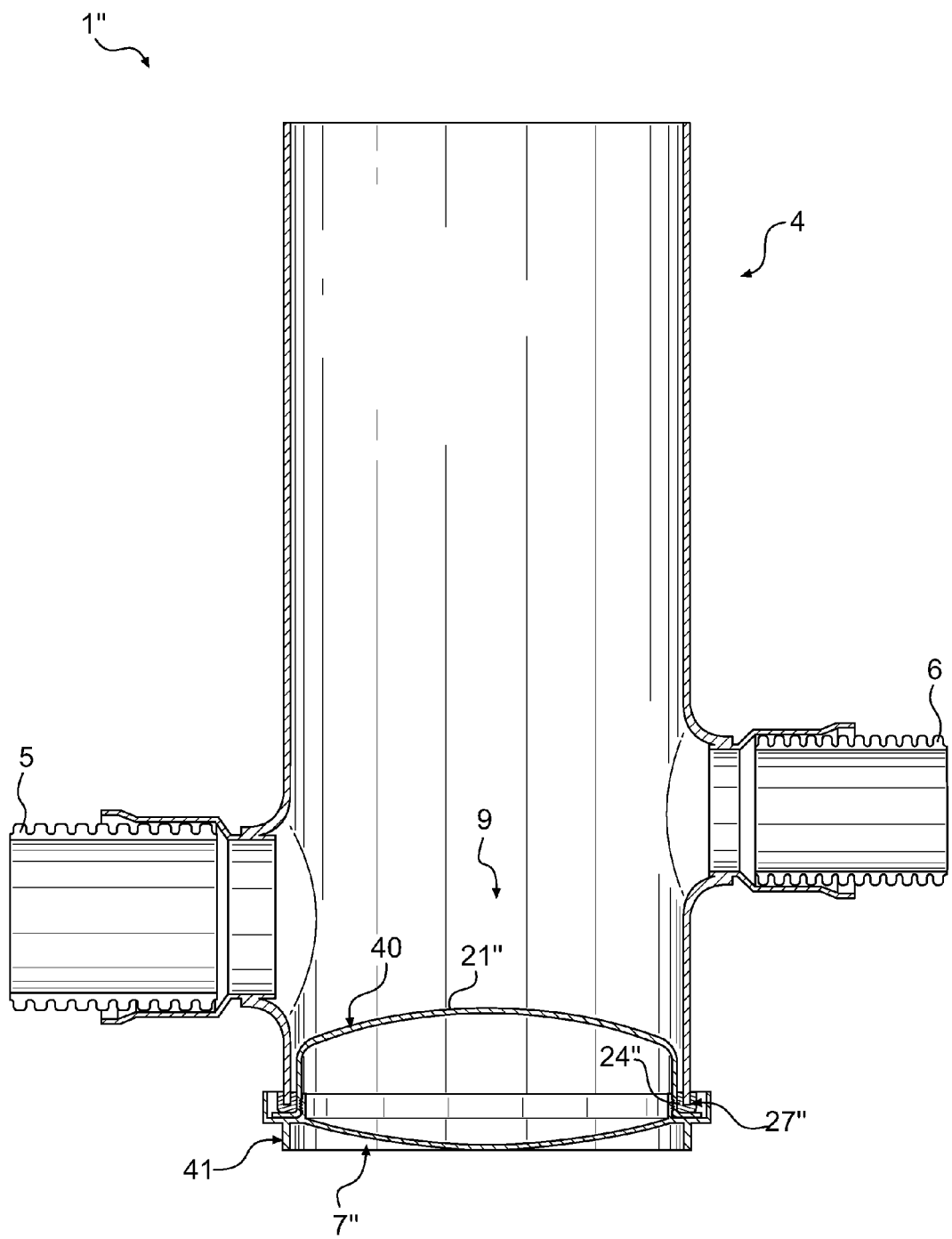
FIG. 10 is a partial cross-sectional view of a drainage system according to an alternative exemplary disclosed embodiment.

FIG. 10 illustrates an exemplary partial view of an alternative embodiment of a drainage system 1". In a similar manner as described above in the embodiments of FIGS. 2 and 3, drainage system 1" may include drain basin 4, first pipe 5, and second pipe 6. Drainage system 1" may also include a two-piece end cap 7" coupled to drain basin 4 at bottom portion 9 of drain basin 4.

Two-piece end cap 7" may include a top piece 40 and a bottom piece 41. Top piece 40 and bottom piece 41 of end cap 7" may be separate structures and coupled to each other prior to connecting end cap 7" to drain basin 4. Drainage system 1" may also include a sealing member 24". Sealing member 24" may be disposed within drain basin 4 and engage an outer surface of drain basin 4. Sealing member 24" may couple top piece 40 to drain basin 4 to form a fluid-tight interface 27" between end cap 7" and drain basin 4. Sealing member 24" may be any suitable type of annular, water-tight gasket. For example, sealing member 24" may be a dual-elastomer gasket including any suitable type of material, such as rubber, polyethylene, Teflon, EPDM, nitrile, thermoplastic elastomers, isoprene, or other plastic compounds. Sealing member 24" may also incorporate various metal inserts or rings, as necessary, to provide structural rigidity.

End cap 7" may be connected to drain basin 4 by inserting a convex surface 21" of top piece 40 into drain basin 4. Convex surface 21" may be positioned up to first pipe 5. In one embodiment, for example, convex surface 21" may be positioned immediately below first pipe 5. In a similar manner as described in the embodiments of FIGS. 3 and 7, fluid may enter drain basin 4, and as the fluid begins to fill the bottom of drain basin 4, convex surface 21" may divert the fluid to first pipe 5 and second pipe 6. The protruding shape of convex surface 21" and its position relative to first pipe 5 may facilitate the flow of the fluid to first and second pipes 5, 6. For example, convex surface 21" may raise the fluid within drain basin 4 to first and second pipes 5, 6, and the fluid then may exit drain basin 4 via first and second pipes 5, 6.

Figure 11:
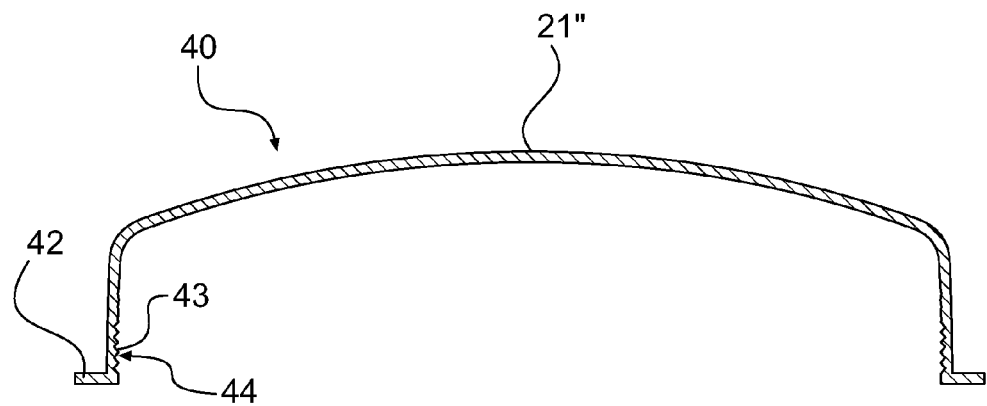
FIG. 11 is a cross-sectional view of a top portion of an end cap of the FIG. 10 drainage system according to an alternative exemplary disclosed embodiment.

FIG. 11 illustrates an exemplary cross-sectional view of top piece 40 of end cap 7". In the embodiment of FIG. 11, convex surface 21" of top piece 40 may be arched and have a domed-shape. It also should be appreciated that convex surface 21" may embody other shapes. For example, convex surface 21" may include one or more side surfaces meeting to form a substantially pointed tip or meeting at a substantially flat top. Top piece 40 may also include a flange 42. Flange 42 may extend horizontally from convex surface 21" and may extend around the diameter of top piece 40. Flange 42 and convex surface 21" may be a single piece of material such that flange 42 is integrally and continuously formed with convex surface 21". In alternative embodiments, flange 42 may be a separate piece of material than convex surface 21" and may be attached or connected to convex surface 21" by any appropriate means. Top piece 40 may also include a first plurality of ridges 43. First plurality of ridges 43 may be defined on an interior surface 44 of top piece 40. Interior surface 44 may be the surface of top piece 40 under convex surface 21" and substantially perpendicular to flange 42, as illustrated in the embodiment of FIG. 11.

Figure 12:
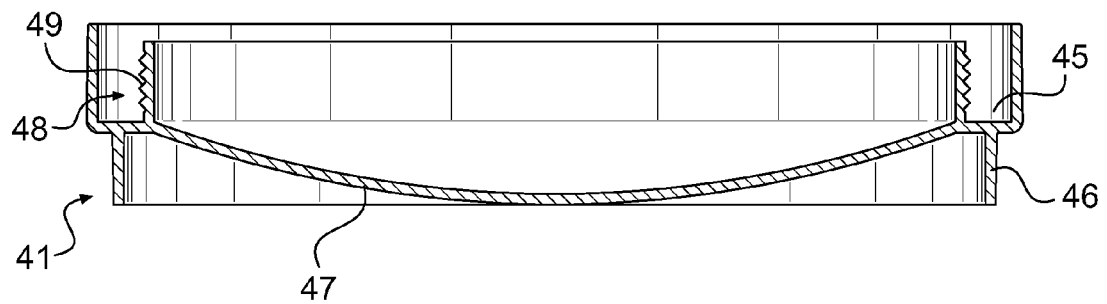
FIG. 12 is a cross-sectional view of a bottom portion of an end cap of the FIG. 10 drainage system according to an alternative exemplary disclosed embodiment.

FIG. 12 illustrates an exemplary cross-sectional view of bottom piece 41 of end cap 7". Bottom piece 41 may include a U-shaped channel 45, a base 46, and a support member 47. In one embodiment, U-shaped channel 45, support member 46, and base 47 may be integrally formed of a single piece of material, as shown in FIG. 12.

U-shaped channel 45 may be configured to receive flange 42 of top piece 40. U-shaped channel 45 may include a vertical surface 48 having a second plurality of ridges 49. Vertical surface 48 may be a vertical protrusion of U-shaped channel 45 configured to engage interior surface 44 of top piece 40. As flange 42 of top piece 40 is inserted into U-shaped channel 45, first plurality of ridges 43 may engage second plurality of ridges 49 to form a friction fit between top piece 40 and bottom piece 41.

Base 46 may include a tubular-shaped structure which may be formed under U-shaped channel 45. Support member 47 may be a dome-shaped structure protruding below U-shaped channel 45. In the embodiment of FIG. 12, base 46 and support member 47 may extend below U-shaped channel 45 to substantially the same distance (i.e., the bottom surface of bottom piece 41 is substantially level). Base 46 and support member 47 may provide structural support and strength to end cap 7". For example, base 46 and support member 47 may brace and reinforce end cap 7" against the ground or surface to which drainage system 1" is disposed due to pressures and loads applied to end cap 7".

As will be appreciated by one of skill in the art, the presently disclosed end cap, drainage system, and methods may enjoy numerous advantages over previously known drainage systems. Firstly, because end caps 7, 7', 7" include convex surfaces 21, 21', 21" inserted into drain basin 4, one of ordinary skill in the art would expect that end caps 7, 7', 7" would provide improved drainage of fluid from drainage systems 1, 1', 1" and also substantially minimize the likelihood of pooling of fluid within drain basin 4. Specifically, the protruding shape of convex surfaces 21, 21', 21" may raise and divert the fluid within drain basin 4 to first and second pipes 5, 6. Because the volume of fluid may be raised to first and second pipes 5, 6, the pooling of fluid, and ultimately, the promotion of undesirable factors, such as odors, bacterial growth, and pests, may be avoided.

Certain features of disclosed end caps 7 and 7' also provide advantages over previously known drainage systems. For example, radial ribs 31 and 31', annular ribs 32 and 32', cylindrical members 29 and 29', and hollow spaces 34 and 34' may provide improved structural support, strength, and resiliency to end caps 7 and 7'. The resulting structural improvements to end caps 7 and 7' may also facilitate the employment of drainage systems 1 and 1' in a greater variety of settings. For example, drainage systems 1 and 1' may be utilized in settings in which high volumes of fluid are to be drained or in areas where the ground or surface may impart high pressure onto drainage system 1 and 1' with a decreased probability of end caps 7 and 7' malfunctioning due to structural failure. Also, because end caps 7 and 7' may engage drain basin 4 via a fiction fit, the installation process of drainage systems 1 and 1' may be simplified. For example, end caps 7 and 7' may be directly engaged to drain basin 4 by simply inserting end caps 7 and 7' through bottom end 9 without the need to provide, for example, an adhesive or a weld. This configuration also may provide eased disassembly of drainage systems 1 and 1', as end caps 7 and 7' may be readily removed from drain basin 4. Disposing sealing members 24 and 24' between end caps 7 and 7' and drain basin 4 may also provide an effective and durable fluid-tight interface between end caps 7 and 7' and drain basin 4, which may prevent undesirable leaks from bottom portion 9 of drainage systems 1 and 1'.

The many features and advantages of the present disclosure are apparent from the detailed specification, and thus, it is intended by the appended claims to cover all such features and advantages of the present disclosure which fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A drainage system for draining a fluid, comprising:
   a drain basin having a tubular body, the tubular body including a lumen, an outer surface, a top end, and a bottom end;
   at least one pipe connected to the tubular body; and
   an end cap coupled to the bottom end of the tubular body, the end cap including a top portion, a bottom portion raised lip, and a convex surface configured to divert the fluid to the at least one pipe, wherein the convex surface of the end cap is inserted through the bottom end and is disposed within the lumen of the tubular body, wherein the raised lip extends from the bottom portion of the end cap towards the top portion of the end cap.

2. The drainage system of claim 1, wherein the at least one pipe includes an inlet, the inlet of the at least one pipe being fluidly connected to the lumen of the tubular body at a junction.

3. The drainage system of claim 2, wherein the convex surface of the end cap extends up to the junction.

4. The drainage system of claim 2, wherein the convex surface of the end cap is disposed below the junction.

5. The drainage system of claim 1, wherein the raised lip is continuous with the convex surface and configured to engage the outer surface of the tubular body.

6. The drainage system of claim 5, further including a sealing member disposed between the raised lip and the outer surface, the sealing member configured to provide a fluid-tight interface between the end cap and the drain basin.

7. The drainage system of claim 6, wherein the raised lip defines a first channel and a second channel, the first channel configured to receive the bottom end of the tubular body and the second channel configured to receive the sealing member.

8. The drainage system of claim 5, wherein the end cap further includes a concave portion, the concave portion including a plurality of radial ribs extending from a center of the concave portion.

9. The drainage system of claim 8, further including a cylindrical member positioned at the center of the concave portion, and wherein the plurality of radial ribs extend from the cylindrical member.

10. The drainage system of claim 8, further comprising an annular rib intersecting the plurality of radial ribs.

11. The drainage system of claim 10, wherein the raised lip, the plurality of radial ribs, the annular rib, the cylindrical member, and the convex surface are formed from a single piece of material.

12. The drainage system of claim 5, further including an outer flange circumscribing the raised lip.

13. The drainage system of claim 12, further including a plurality of braces arranged around the raised lip and engaged with the outer flange.

14. The drainage system of claim 12, wherein the outer flange includes a plurality of radial projections, each radial projection having an aperture.

15. The drainage system of claim 1, wherein the end cap is coupled to the drain basin via a friction fit.

16. A drainage system for draining a fluid, comprising:
   a drain basin having a tubular body, the tubular body including a lumen, an outer surface, a first end, and a second end;
   at least one pipe connected to the tubular body; and
   an end cap including a lip, a convex surface, and at least one channel formed between the lip and the convex surface, wherein the end cap is coupled to the tubular body such that the first end of the tubular body is disposed within the at least one channel of the end cap and the convex surface is disposed within the lumen of the tubular body to divert fluid to the at least one pipe.

17. The drainage system of claim 16, wherein the lip is configured to engage the outer surface of the tubular body.

18. The drainage system of claim 17, further comprising a sealing member disposed within the at least one channel of the end cap, wherein the sealing member is configured to provide a fluid-tight interface between the end cap and the tubular body.

19. The drainage system of claim 16, wherein the end cap further includes a concave portion, the concave portion including a plurality of radial ribs extending from a center of the concave portion.

20. The drainage system of claim 16, wherein the end cap further includes an outer flange circumscribing the lip.

21. The drainage system of claim 20, wherein the end cap further includes a plurality of braces arranged around the lip and engaged with the outer flange.

22. The drainage system of claim 16, wherein the lip extends from a bottom portion of the end cap towards a top portion of the end cap.

23. The drainage system of claim 16, wherein the at least one channel includes a first channel and a second channel, wherein the first channel is configured to receive the first end of the tubular body, and the second channel is configured to receive a sealing member configured to provide a fluid-tight interface between the end cap and the tubular body.

24. A drainage system for draining a fluid, comprising:
a drain basin having a tubular body, the tubular body including a lumen, an outer surface, a top end, and a bottom end;
at least one pipe connected to the tubular body; and
an end cap coupled to the bottom end of the tubular body, the end cap including a concave portion and a convex surface configured to divert the fluid to the at least one pipe, wherein the convex surface of the end cap is inserted through the bottom end and is disposed within the lumen of the tubular body, wherein the concave portion includes a plurality of radial ribs extending from a center of the concave portion.

25. The drainage system of claim 24, further including a cylindrical member positioned at the center of the concave portion, and wherein the plurality of radial ribs extend from the cylindrical member.

26. The drainage system of claim 24, further comprising an annular rib intersecting the plurality of radial ribs.

27. The drainage system of claim 26, wherein the raised lip, the plurality of radial ribs, the annular rib, the cylindrical member, and the convex surface are formed from a single piece of material.

\* \* \* \* \*